(12) United States Patent
Bai (10) Patent No.: US 12,504,084 B2
(45) Date of Patent: Dec. 23, 2025

(54) EXCESS FLOW VALVE WITH SELF-RESETTING FUNCTION

(71) Applicant: Yi-Jhih Bai, Taichung (TW)

(72) Inventor: Yi-Jhih Bai, Taichung (TW)

( * ) Notice: Subject to any disclaimer, the term of this patent is extended or adjusted under 35 U.S.C. 154(b) by 43 days.

(21) Appl. No.: 18/669,557

(22) Filed: May 21, 2024

(65) Prior Publication Data
US 2025/0224043 A1  Jul. 10, 2025

(30) Foreign Application Priority Data
Jan. 8, 2024  (TW) .................................. 113100788

(51) Int. Cl.
*F16K 17/28* (2006.01)
*F16K 17/04* (2006.01)

(52) U.S. Cl.
CPC ........ *F16K 17/285* (2013.01); *F16K 17/0413* (2013.01)

(58) Field of Classification Search
CPC .................. F16K 1/305; F16K 17/285; F17C 2223/0123; F17C 2205/0382; F17C 2205/0332
See application file for complete search history.

(56) References Cited

U.S. PATENT DOCUMENTS

| 799,203 | A | * | 9/1905 | Swinny | F16K 1/307 137/901 |
| 4,223,692 | A | * | 9/1980 | Perry | F17C 13/12 137/460 |
| 4,372,343 | A | * | 2/1983 | Trinkwalder, Jr. | F17C 13/04 222/545 |
| 6,564,827 | B1 | * | 5/2003 | Henneborn | F16K 1/306 137/514.7 |
| 2008/0289700 | A1 | * | 11/2008 | Masingale | F16K 1/307 137/461 |

* cited by examiner

*Primary Examiner* — P. Macade Nichols (57) ABSTRACT

An excess flow valve includes a valve body including an inlet, an outlet, and a pressure relief portion. The inlet includes an outlet port. A pressure relief valve is positioned in the pressure relief portion. A resetting device is installed within the pressure relief valve, and includes a push rod. An excess flow device is installed within the inlet and includes a flow-stopping component which blocks the outlet port when subjected to fluid pressure exceeding a set limit. When the push rod is moved by a force, one end of the push rod moves toward a position where the flow-stopping component blocks the outlet port. After abnormal exclusion, simply operating the push rod to move the flow-stopping component to release the obstruction. Users can easily release the obstruction of the excess flow device to the fluid by operating the resetting device.

6 Claims, 8 Drawing Sheets

EXCESS FLOW VALVE WITH SELF-RESETTING FUNCTION

FIELD OF THE INVENTION

The present invention relates to an excess flow valve, typically installed in gas storage devices (e.g., gas cylinders). It serves the purpose of preventing gas from leaking out continuously in case of accidents, and can be easily reset when the accident is resolved.

BACKGROUND OF THE INVENTION

Currently available excess flow valves on the market, once their fluid shut-off mechanism is activated, cannot be released from blocking the fluid unless the entire valve is removed from the gas storage device. This method of releasing the valve's blockage of fluid can be very troublesome for users, and improper operation may lead to significant gas leakage from the gas storage device. Therefore, professional assistance is often required to release the valve's blockage of fluid in case of abnormal release.

The present invention intends to provide an excess flow valve with self-resetting function to eliminate the shortcomings mentioned above.

SUMMARY OF THE INVENTION

The present invention relates to an excess flow valve comprising a valve body comprises an inlet, an outlet, and a pressure relief portion. The inlet includes an outlet port, and a pressure relief valve is positioned in the pressure relief portion. A resetting device is installed within the pressure relief valve, and the resetting device includes a push rod. An excess flow device is installed within the inlet, and comprises a flow-stopping component which blocks the outlet port when subjected to fluid pressure exceeding a set limit. When the push rod is moved by a force, one end of the push rod moves toward a position where the flow-stopping component blocks the outlet port.

The primary object of the present invention is that a resetting device is installed to the pressure relief valve of the valve body. The resetting device includes a push rod. Typically, the excess flow device activates its shut-off mechanism when the thrust of the fluid passing through exceeds the set value, causing the flow-stopping component to block the outlet port, thereby achieving the shut-off effect. In this status, one end of the push rod corresponds to the position where the flow-stopping component blocks the outlet port. Therefore, after abnormal exclusion, simply operating the push rod to move the flow-stopping component allows for its release. This means users can easily release the obstruction of the excess flow device to the fluid by operating the resetting device, without the need to dismantle it from the gas storage device as required by conventional products. The present invention indeed addresses the issues present in traditional products and demonstrates novelty and progressiveness to provide a securing device The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
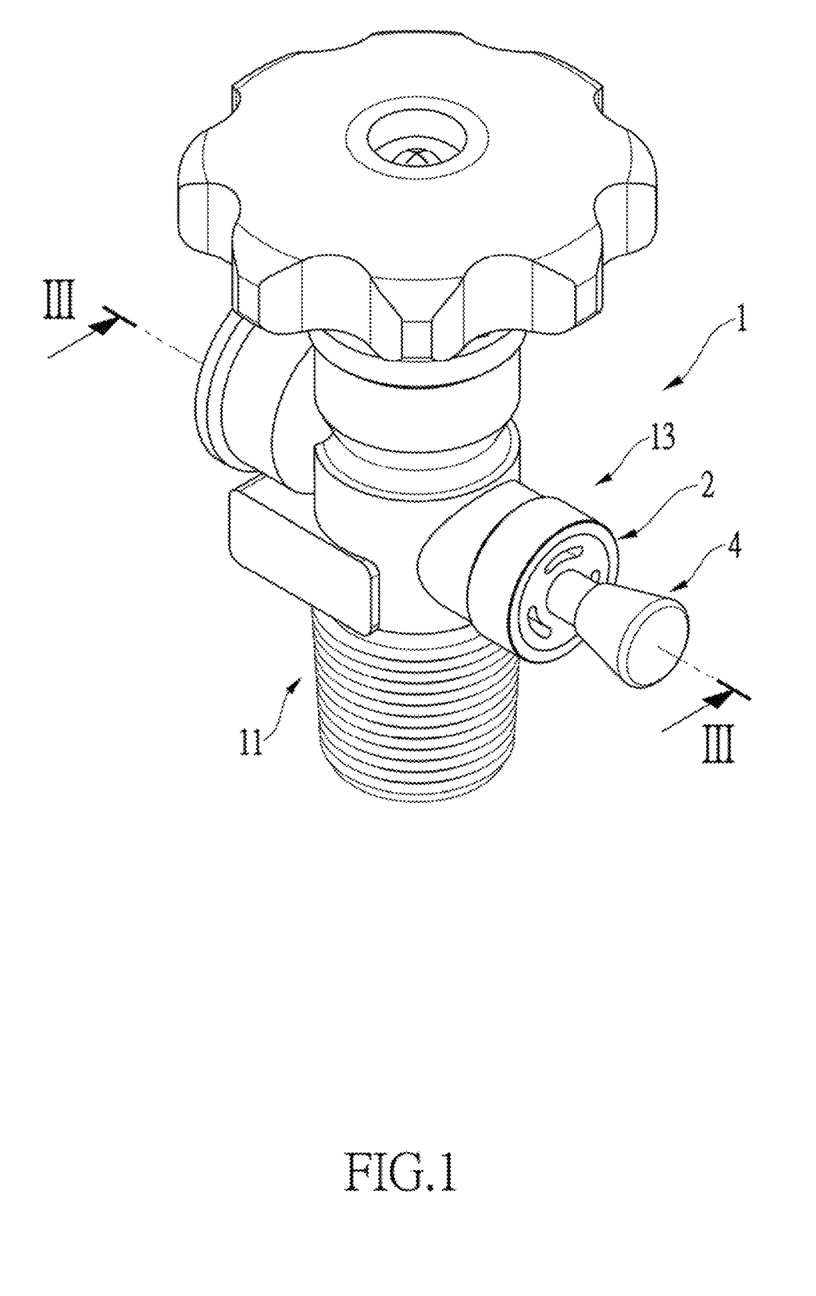
FIG. 1 is a perspective of the present invention.
Figure 2:
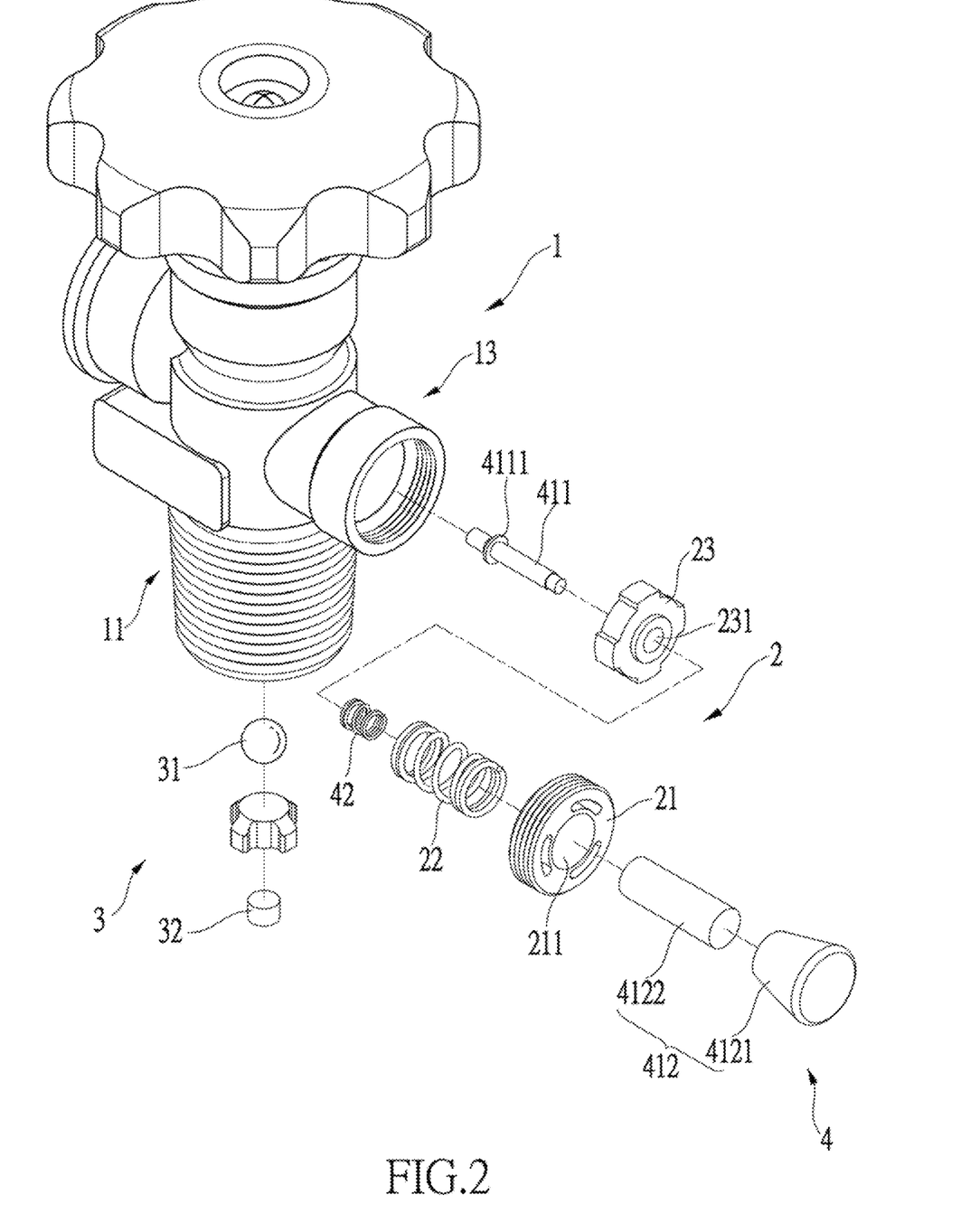
FIG. 2 is an exploded view of the present invention.
Figure 2A:
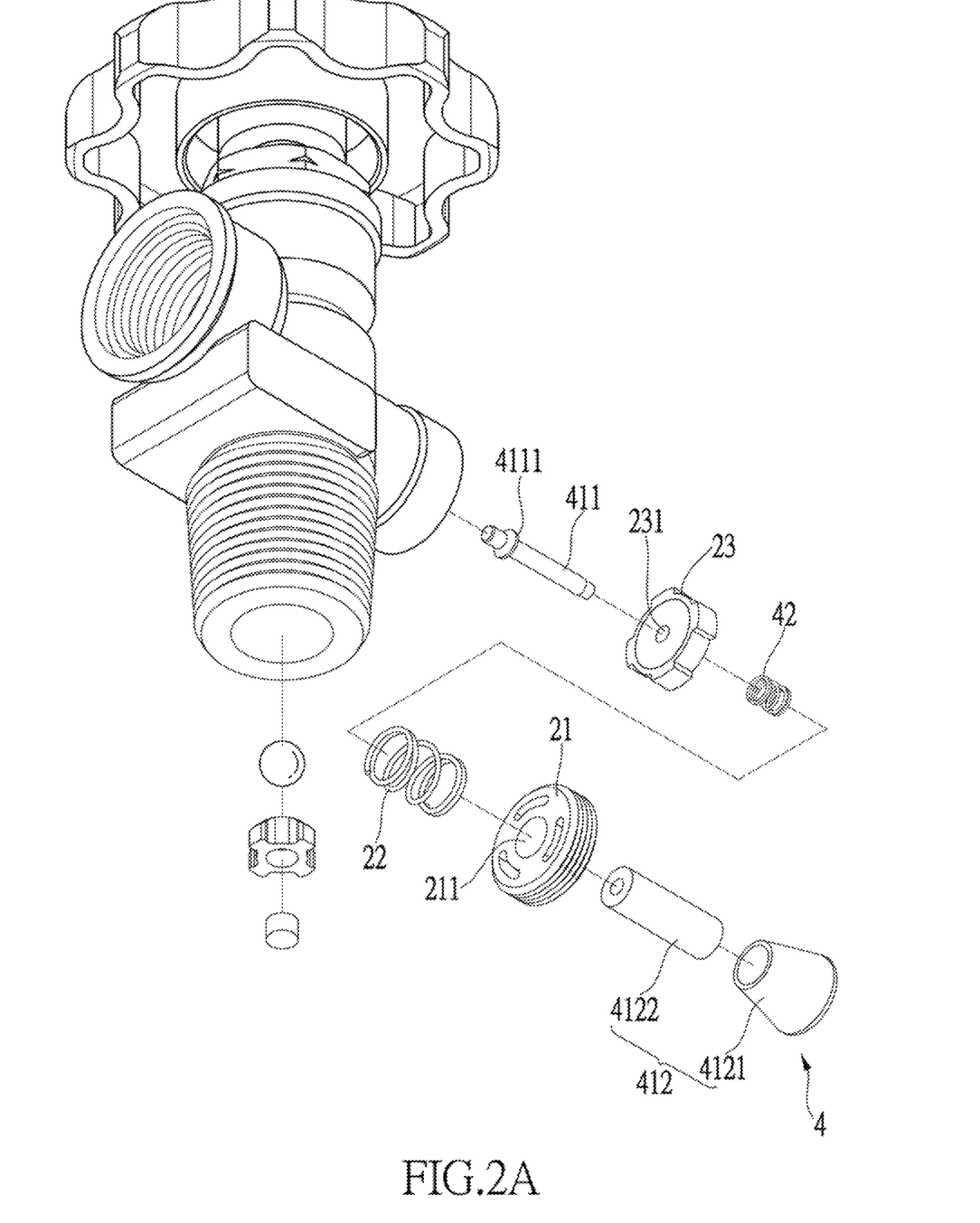
FIG. 2A is another exploded of the present invention.
Figure 3:
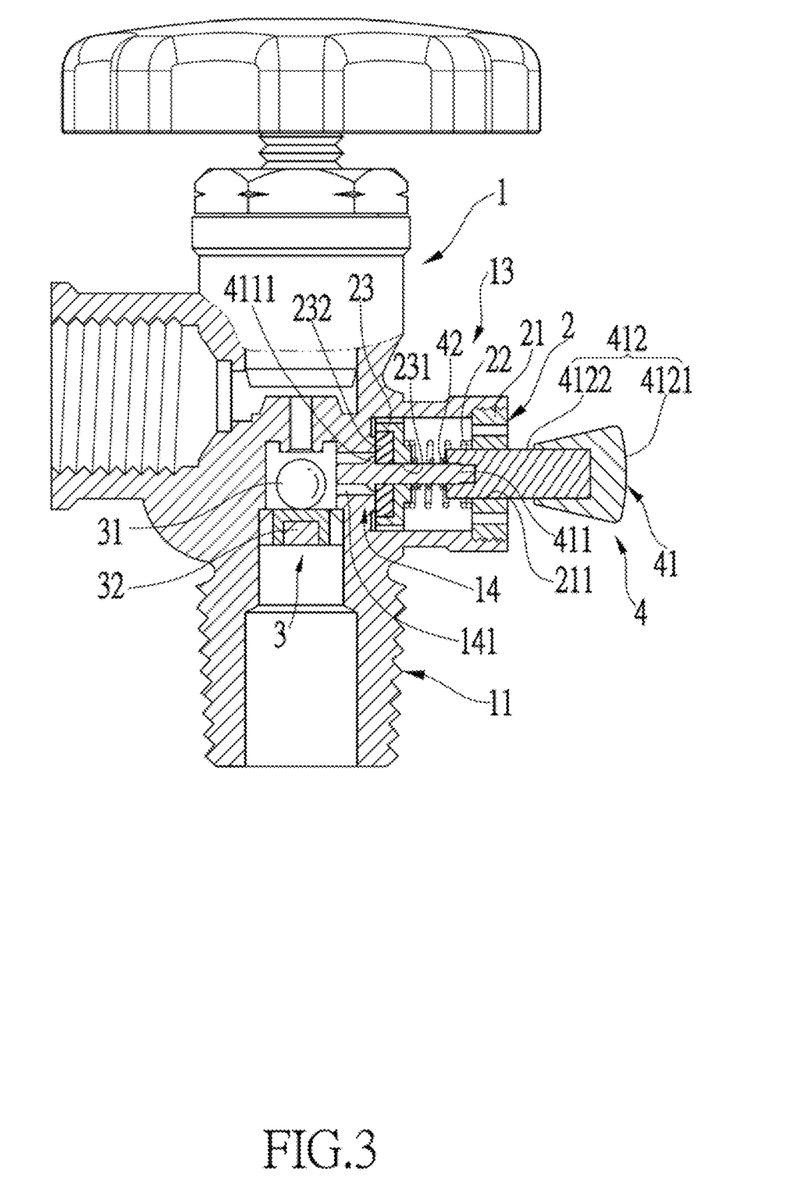
FIG. 3 is a cross sectional view, taken along line III-III of FIG. 1.

Referring to FIGS. 1 to 3, the excess flow valve with self-resetting function comprises a valve body (1) including an inlet (11), an outlet (12), and a pressure relief portion (13). The inlet (11) includes an outlet port (111), and a pressure relief valve (2) is positioned in the pressure relief portion (13). A resetting device (4) is installed within the pressure relief valve (2) and includes a push rod (41). An excess flow device (3) is installed within the inlet (11) and comprises a flow-stopping component (31) which blocks the outlet port (111) when subjected to fluid pressure exceeding a set limit. When the push rod (41) is moved by a force, one end of the push rod (41) moves toward a position where the flow-stopping component (31) blocks the outlet port (111).

Figure 4:
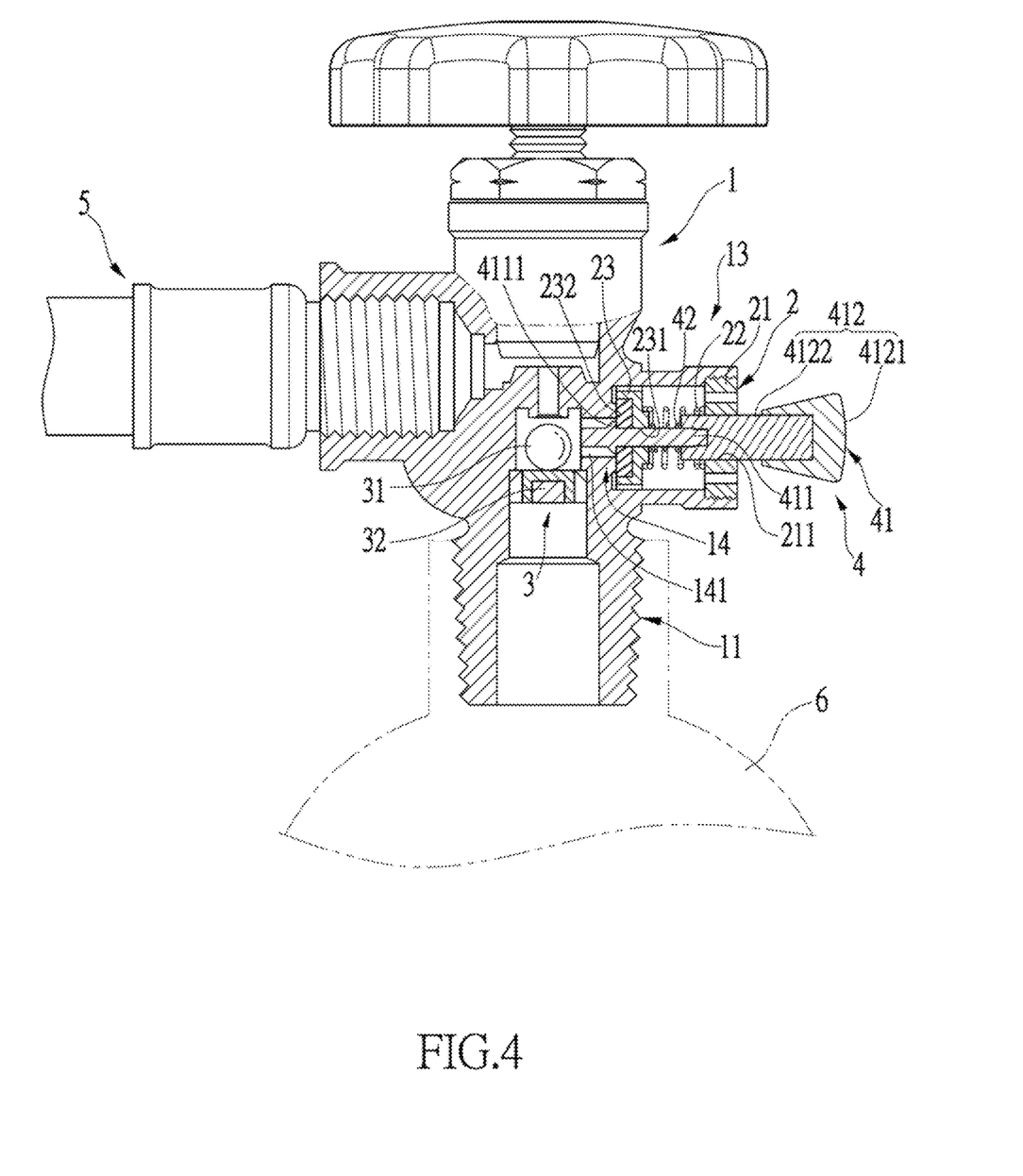
FIG. 4 illustrates the actual use of the present invention.
Figure 5:
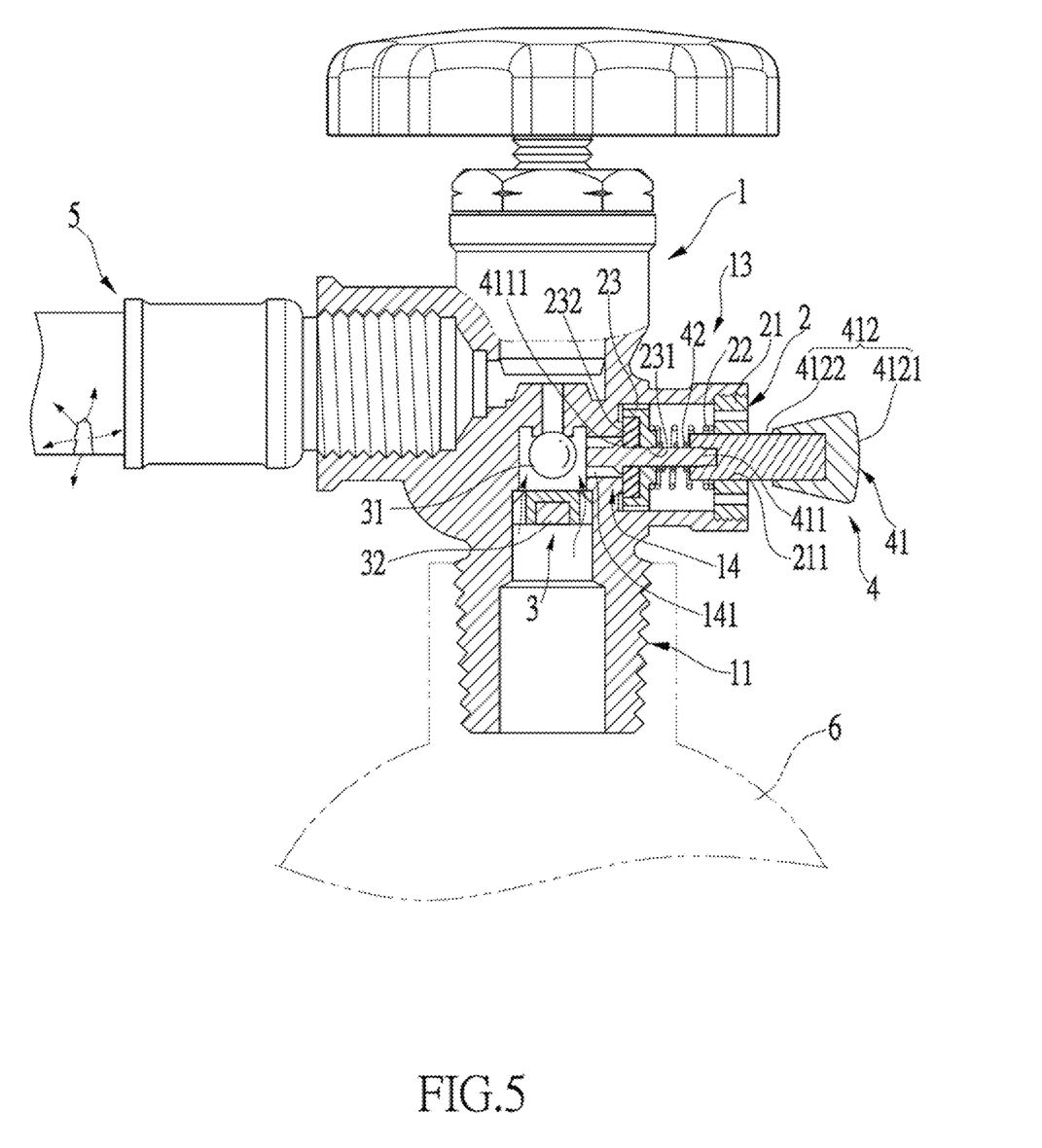
FIG. 5 shows the blockage of the outlet port by the flow-stopping component when the pipeline ruptures.
Figure 6:
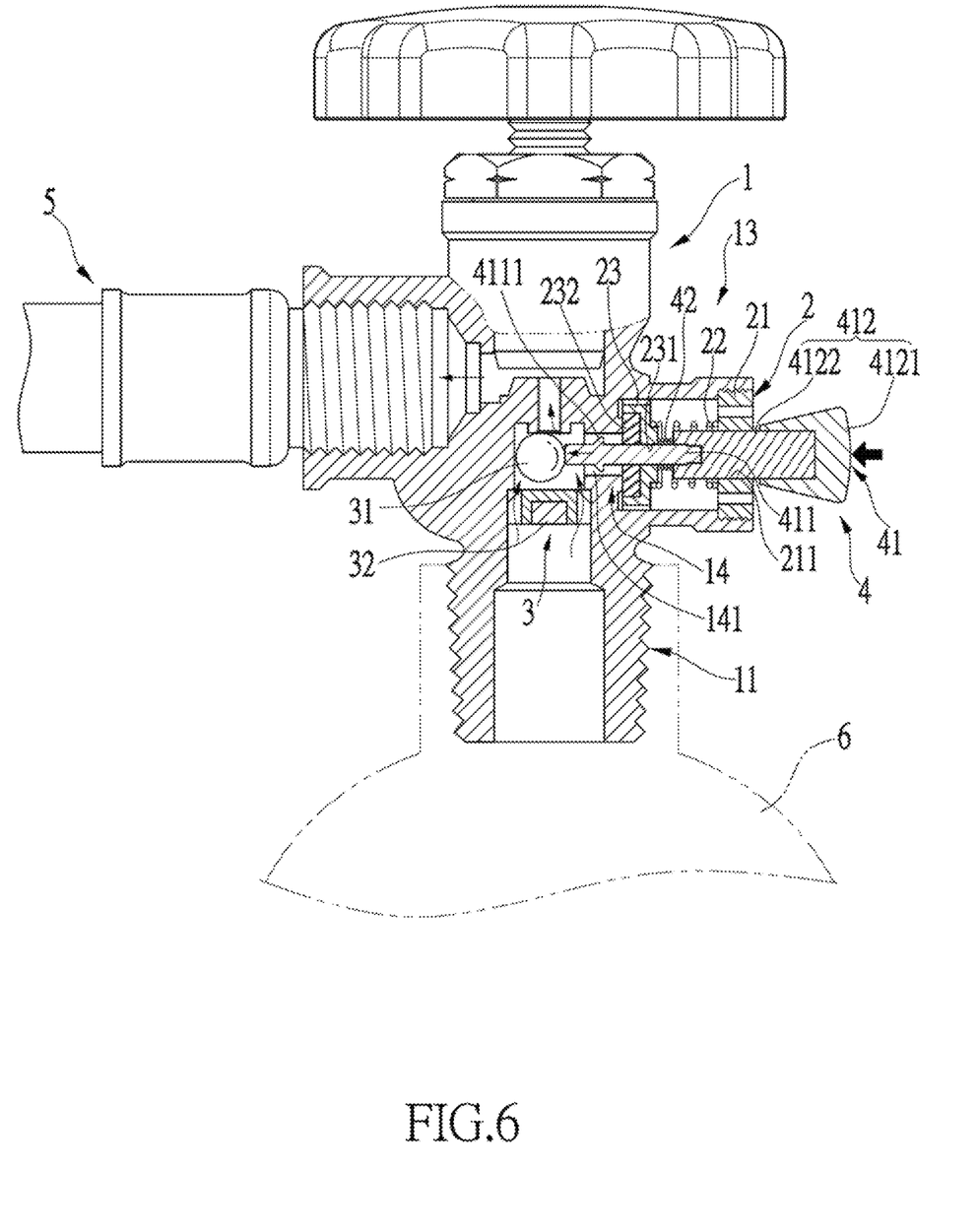
FIG. 6 shows the push rod abutting against the flow-stopping component.

As shown in FIG. 4, this embodiment illustrates the installation of the inlet portion (11) on a gas storage device (6), and the connection of the outlet portion (12) to a pipeline (5). In this embodiment, a resetting device (4) is added to the pressure relief valve (2) of the valve body (1), and the resetting device (4) includes a push rod (41). Typically, the excess flow device (3) activates its shut-off mechanism when the thrust of the fluid passing through exceeds the set limit, causing the flow-stopping component (31) to block the outlet port (111), thereby achieving the shut-off effect. The resetting device (4) is normally of the type where the flow-stopping component (31) is magnetically attracted and fixed by a magnet (32). The set limit mentioned earlier is determined by the strength of the magnet (32). As shown in FIG. 5, in case of an accident (e.g., pipeline rupture), the thrust of the fluid passing through the flow-stopping component (31) increases instantly, causing the magnet (32) to be unable to hold the flow-stopping component (31), thus blocking it at the outlet port (111) to prevent gas leakage. As shown in FIG. 6, one end of the push rod (41) corresponds to the position where the flow-stopping component (31) blocks the outlet port (111). Therefore, after the abnormal condition is rectified (pipeline repaired), simply operating the push rod (41) to move the flow-stopping component (31) allows for its release, enabling the flow-stopping component (31) to be reattached to the magnet (32) and completing the resetting of the excess flow device (3).

Accordingly, when in use the present invention, users can easily release the obstruction of the excess flow device (3) to the fluid by operating the resetting device (4), without the need to dismantle it from the gas storage device, as required by conventional products. The present invention indeed addresses the issues present in traditional products and demonstrates novelty and progressiveness.

As shown in FIGS. 1 to 6, a neck (14) is located between the inlet (11) and the pressure relief portion (13). The neck (14) has a channel (141). The pressure relief valve (2) includes a blocking piece (21), a resilient element (22), and a valve member (23). The blocking piece (21) is fixed within the inlet (11) and includes a first perforation (211). The resilient element (22) is located between the blocking piece (21) and the valve member (23). The valve member (23) resiliently contacts the neck (14) and includes a second perforation (231). The push rod (41) extends through the first perforation (211), the second perforation (231), and the channel (141). The push rod (41) comprises an interconnected rod body (411) and an operating button (412). The rod body (411) partially traverses through the second perforation (231) and the channel (141). The rod body (411) is surrounded by a flange (4111) located on one side of the valve member (23) facing towards the inlet (11). The flange (4111) cannot pass through the second perforation (231). The operating button (412) extends through the first perforation (211). The resetting device (4) includes a spring (42) which is biased between the operating button (412) and the valve member (23).

The operating button (412) presents a bell-shaped button. This structure provides a larger surface area at the end when compared to cylindrical buttons so as to facilitate user force operation.

Furthermore, the valve member (23) contacts the neck (14) by a resilient washer (232) so as to enhance the sealing effect of the valve member (23).

Figure 7:
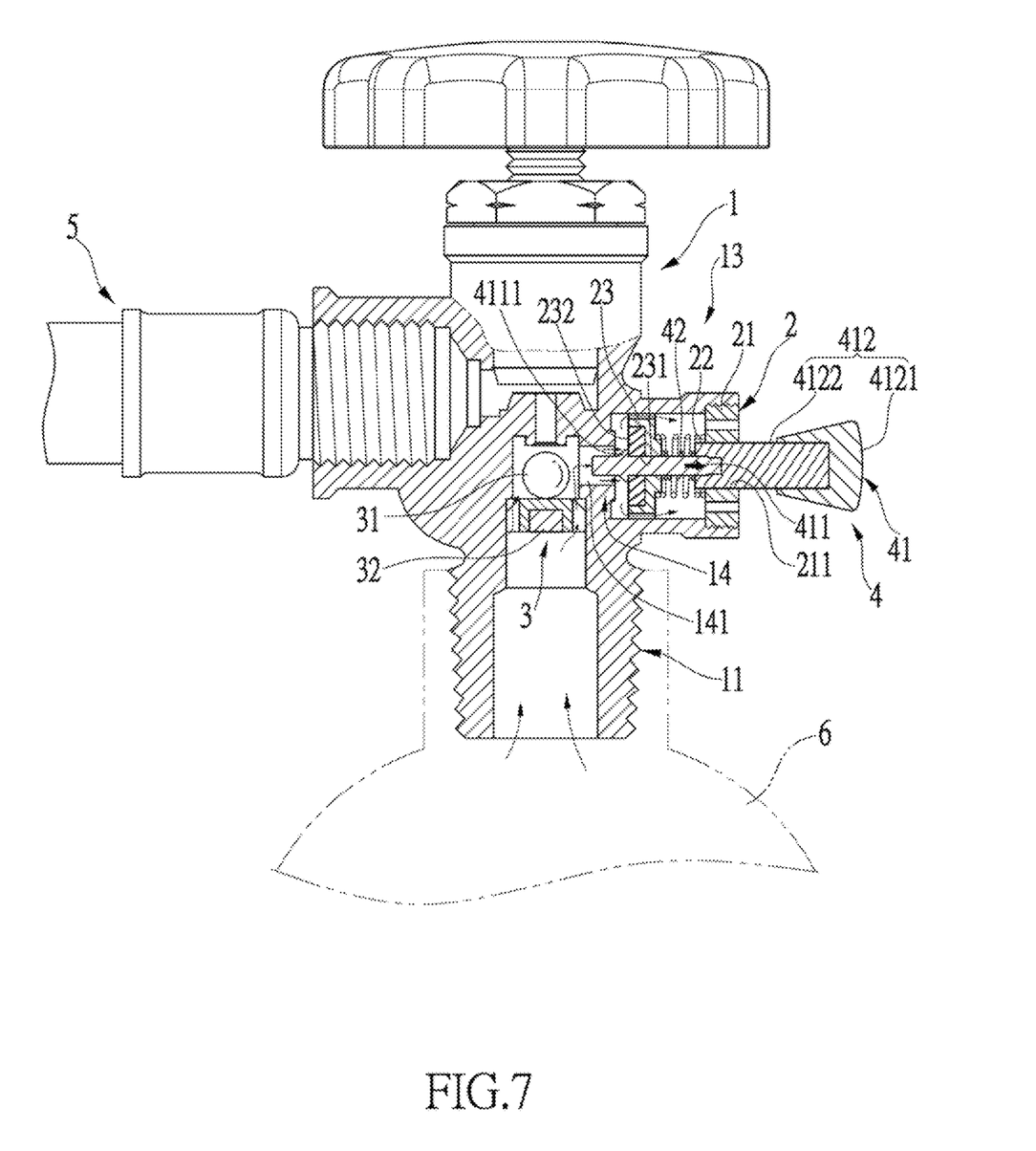
FIG. 7 shows the displacement of the valve member outward due to high internal pressure within the valve body.

As shown in FIG. 7, when the internal pressure within the valve body (1) becomes too high, the valve member (23) will be displaced outward due to the pressure to detach from the neck (14). It is noted that the installation of the resetting device (4) does not affect the smooth operation of the pressure relief valve (2).

As shown in FIGS. 2 and 3, the operating button (412) comprises a button head (4121) and a button body (4122). One of two ends of the button body (4122) is inserted into the button head (4121), and another one of the two ends of the button body (4122) extends through the first perforation (211).

While we have shown and described the embodiment in accordance with the present invention, it should be clear to those skilled in the art that further embodiments may be made without departing from the scope of the present invention.

What is claimed is:

1. An excess flow valve comprising a valve body (1) including an inlet (11), an outlet (12), and a pressure relief portion (13), the inlet (11) including an outlet port (111), a pressure relief valve (2) positioned in the pressure relief portion (13), and a resetting device (4) installed within the pressure relief valve (2), the resetting device (4) including a push rod (41), an excess flow device (3) installed within the inlet (11), the excess flow device (3) comprising a flow-stopping component (31) which blocks the outlet port (111) when subjected to fluid pressure exceeding a set limit, when the push rod (41) is moved by a force, one end of the push rod (41) moves toward a position where the flow-stopping component (31) blocks the outlet port (111).

2. The excess flow valve as claimed in claim 1, wherein a neck (14) is located between the inlet (11) and the pressure relief portion (13), the neck (14) has a channel (141), the pressure relief valve (2) includes a blocking piece (21), a resilient element (22), and a valve member (23), the blocking piece (21) is fixed within the inlet (11) and includes a first perforation (211), the resilient element (22) is located between the blocking piece (21) and the valve member (23), the valve member (23) contacts the neck (14) and includes a second perforation (231), the push rod (41) extends through the first perforation (211), the second perforation (231), and the channel (141).

3. The excess flow valve as claimed in claim 2, wherein the push rod (41) comprises an interconnected rod body (411) and an operating button (412), the rod body (411) partially traverses through the second perforation (231) and the channel (141), the rod body (411) is surrounded by a flange (4111) located on one side of the valve member (23) facing towards the inlet (11), the flange (4111) cannot pass through the second perforation (231), the operating button (412) extends through the first perforation (211), the resetting device (4) includes a spring (42) which is biased between the operating button (412) and the valve member (23).

4. The excess flow valve as claimed in claim 3, wherein the operating button (412) presents a bell-shaped button.

5. The excess flow valve as claimed in claim 2, wherein the valve member (23) contacts the neck (14) by a resilient washer (232).

6. The excess flow valve as claimed in claim 2, wherein the operating button (412) comprises a button head (4121) and a button body (4122), one of two ends of the button body (4122) is inserted into the button head (4121), and another one of the two ends of the button body (4122) extends through the first perforation (211).

* * * * *